United States Patent Office 2,703,754
Patented Mar. 8, 1955

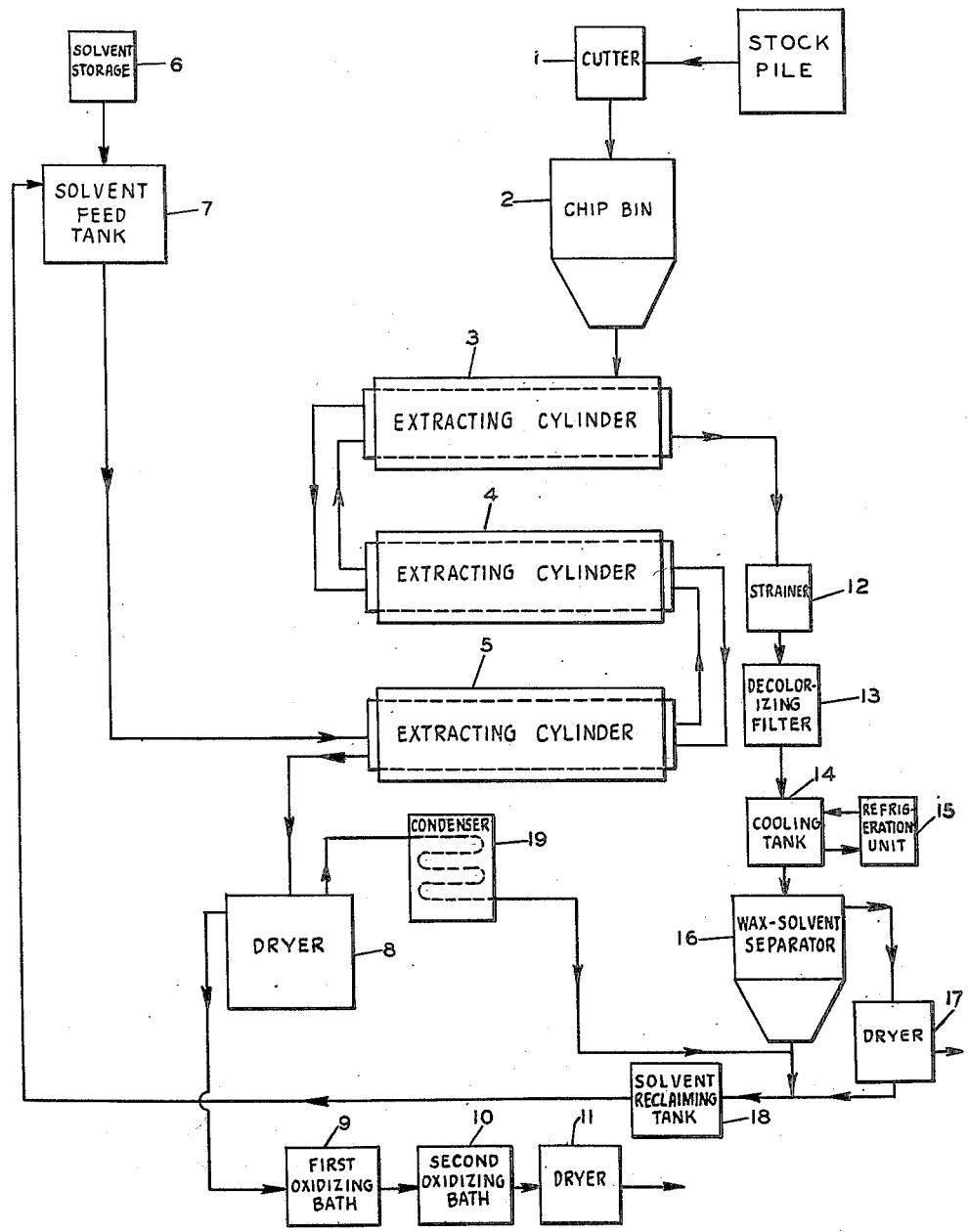

2,703,754

PROCESS OF TREATING WAXED PAPER

Robert Evershed Myers, Wynnewood, Pa.

Application July 27, 1949, Serial No. 107,129

4 Claims. (Cl. 92—1.6)

The present invention relates to a process of treating waxed paper to separate the wax from the paper and, more particularly, it relates to a process by which the wax contained in waxed paper waste products may be economically recovered and by which the paper may be obtained in a form readily available for re-use in the production of further paper products, after treatment by a novel de-inking step in the event colored printed waxed paper is treated in the process. Hereinabove, reference has been made to paper and waste paper products, and this term is used in its generic sense to include products deposited from a suspension of cellulose fibres, irrespective of the type of stock and thickness, for example, it includes waxed containers for milk, cheese, and the like, food wraps, such as bread wraps and the like.

Heretofore, various processes have been suggested for the treatment of waxed paper to recondition the paper fibres for re-use in the manufacture of paper products. These processes, for the most part, have involved the fiberization of the waste waxed paper and the treatment of the water-suspension of the fibres with a wax-emulsification agent, following which the emulsion is separated from the paper fibres. In addition, various procedures have been suggested for the treatment of the printed waste paper fibres to remove the printing ink therefrom. The processes heretofore suggested have not provided as economical and efficient a process as is desired, particularly from the standpoint of the recovery of the wax in a saleable form, and each of the processes possesses inherent disadvantages from the standpoint of processing difficulties and of cost. Thus, when the paper is fibrated, there is a loss of paper fibres in the white water amounting to as much as 10%, and problems are presented in drying the recovered fibres.

One object of the present invention is, therefore, to provide a process for the treatment of waxed paper which overcomes the difficulties inherent in the prior processes and which is characterized by its relative low cost and freedom from processing difficulties.

A further object of the invention is to provide an economical process for the treatment of waxed paper waste to recover, on the one hand, the wax in a saleable form and, on the other, the paper in a form which may readily be used in the production of further paper products.

Still another object of the invention is the provision of a process by which waxed color-printed paper waste may be treated to remove the wax therefrom, followed by a novel de-inking step which efficiently removes the colored printing ink from the paper, thus providing a cheap source of paper-making stock.

Other objects will be apparent from a consideration of this specification and the claims.

As stated above, the previous processes have usually relied upon the treatment of a fiberized water-suspension of the wax paper with a wax-emulsification agent for the separation of the wax from the paper fibres. In contrast to such procedures, in the process of the present invention, the waxed paper is not fiberized or pulped to form a water-suspension of the fibres, but is treated in paper form, the paper being reduced to such size by cutting, chopping, or shredding as may be convenient from a manufacturing standpoint. Furthermore, instead of using a wax-emulsification agent which will result in an emulsion of the wax and water, the waxed paper is treated with an anhydrous solvent having the special characteristics hereinafter discussed, the use of which overcomes the various difficulties present in the handling of an emulsion and the separation of the wax therefrom. In addition, when waxed paper waste, which has been printed with a colored ink, is treated by the process, the color is removed from the paper, still material in paper form, i. e. unfiberized, by the novel and efficient de-inking step hereinafter described.

By the process of the present invention, waxed paper waste, including waxed printed waste, which has a very low commercial value, so low that it is often discarded or burned, may be converted to a high grade paper-making stock free from wax, and containing undamaged, bright white fibres, comparable in quality to bleached commercial wood pulp and, at the same time, the wax may be recovered and made available for use for the same or other purposes in the form of a product of a quality approximately that of the wax originally used.

In accordance with the process of the present invention, the anhydrous solvent employed in the treatment of the waxed paper, maintained in paper form, is one in which the wax is soluble at one range of temperatures but is substantially insoluble at another and lower range of temperatures. This special solvent for the wax is brought into contact with the waxed paper at a temperature at which the wax is soluble therein and after the wax is dissolved, the solution is removed from the paper and is cooled to a temperature at which the wax is substantially insoluble in the solvent and separates therefrom as a sludge. The wax is then separated from the solvent. The paper from which the solution of wax has been removed is treated to remove the adhering solvent and thereafter, if the paper contains colored printing ink, it is advantageously subjected to a de-inking process involving a double oxidation treatment as fully described hereinafter. Preferably, the treatment of the waxed paper with the solvent involves a counter-current extraction, and it is usually advantageous to pass the solution of the wax, after its removal from the paper and before cooling, through a decolorizing medium so that the wax separation by the solution will be colorless.

In the drawing, the preferred process is illustrated by means of flow sheet, but it is to be understood that this is merely illustrative of the invention and that other procedures falling within the scope of the invention may be used, if desired.

Referring to the waxed paper, any paper product which is coated and/or impregnated with wax may be treated in accordance with the process of the invention, and, as stated above, the process is applicable for the treatment of waxed color-printed paper waste as well as unprinted wax papers. Advantageously, the waxed paper prior to the treatment by the solvent is cut or chopped to a size to aid in the handling of the product, for example, to a size where the longest dimension does not exceed about 8½ inches, preferably does not exceed about 2½ inches and where the minimum dimension is not less than about ¼ inch, preferably is not less than about ½ inch. In no event, however, is the interfelted structure of the paper destroyed; in other words, the paper is not fiberized. The cut or chopped paper is hereinafter referred to as "paper chips."

The anhydrous solvent may be any solvent for the wax in which the wax is soluble at one temperature range and is substantially insoluble at a lower temperature range, and advantageously the solvent is a liquid at ordinary temperatures, for example 30° C., and having a vapor pressure at 40° C. of less than about 200 mm. of mercury. In the preferred embodiment, the solvent is a chlorinated hydrocarbon possessive of these properties, for example carbon tetrachloride, ethylene dichloride, trichlorethylene, perchlorethylene, tetrachlorethane, and pentachlorethane. Each of these solvents possesses the described property of being a solvent for the wax at one range of temperatures and of not being a wax solvent at a lower range of temperatures. Of the chlorinated hydrocarbon solvents mentioned, the use of trichlorethylene, perchlorethylene, or carbon tetrachloride is preferred. In using trichlorethylene, the wax is advantageously dissolved at a temperature of about 87° C. and may be separated from the solvent at a temperature of about −20° C.; in the case of perchlorethylene, a temperature of about 121° C. may be advantageously used for dissolving the wax and a temperature of about −15° C. for the separation of the wax from the solvent; and in the case of carbon tetrachloride, the respective temperatures may be about 76° C. and about −15° C. Mixtures of two or more solvents may be used, if desired, provided, of course, that the resulting mixture possesses the property desired.

It will be noted from the above that wax is readily soluble in wax solvents at elevated temperatures, such as in the neighborhood of 76–121° C. with the above-mentioned solvents, and is relatively insoluble therein at low temperatures, such as in the neighborhood of −15 to −20° C. with the above-mentioned solvents. Thus, the solubility of wax in wax solvents depends upon the temperature conditions, the solubility increasing as the temperature increases. With trichloroethylene, for example, the solubilities of wax therein, measured as pounds of wax per 100 pounds of trichloroethylene, at various temperatures are as follows:

| Solubility: | Temperature, ° C. |
|---|---|
| 0.13 | −19 |
| 0.25 | −14 |
| 0.5 | −10 |
| 1.0 | −5 |
| 4.0 | 5 |
| 8.0 | 14 |
| 10.0 | 16 |
| 27.0 | 25 |
| 80.0 | 35 |

From the above data it will be seen that at the lower range of temperatures, the wax is substantially insoluble in the solvent, while at the upper range of temperatures, the wax is readily soluble therein.

The anhydrous solvent is brought into contact with the waxed paper chips at a temperature at which the wax is soluble in the solvent, and this is advantageously accomplished by suitably heating the extraction equipment by a steam jacket or electrically. The amount of solvent used will preferably be sufficient so that a slurry of the wax in the solvent will be obtained when the solution is cooled to the point where the wax is substantially insoluble in the solvent. For example, in the treatment of a ton of waxed paper containing ⅓ part of wax by weight, satisfactory results were obtained using 70 gallons of trichlorethylene. As stated, it is preferable to use the counter-current principle of extraction in which the fresh solvent comes into contact with the paper chips from which most of the wax has been removed; that is to say, it is advantageous to use equipment in which the general movement of the paper chips through the equipment is opposite to the general movement of the solvent through the same equipment. As will appear in connection with the description of the flow sheet, it is advantageous to use a plurality of cylinders, employing counter-current flow throughout.

After the solution of wax has been removed from contact with the paper chips and before it has cooled to the point where the wax will separate from the solution, it is often desirable, particularly when color printed paper has been treated, to pass the solution through a decolorizing filtering medium such as bone char, fuller's earth, and the like, serving as a color-adsorption agent. In this event, the solution must be maintained at a temperature above the crystallization temperature of the wax in the solution, and, if necessary or desirable, the filtering medium may be suitably heated by a steam jacket or electrically.

The wax is separated from the solution by cooling or chilling the solution to the required temperature, for example, by passing it through refrigerating coils or other equipment. When the solution has been cooled to the level where the solvent has substantially no solvent power for the wax, the wax will separate from the solvent in the form of a sludge and the solvent will contain only a very little wax and foreign matter. The wax may be readily separated from the solvent by filtration, centrifuging, or the like, and, if desired, may subsequently be heated to remove any residual solvent contained therein. The solvent, if desired, may be distilled to remove therefrom any small amount of wax and foreign matter.

The paper chips from which the solution of wax has been removed are advantageously heated to remove the adhering solvent therefrom and it will be found that, for all practical purposes, the paper chips will be free from wax. The paper chips after removal of the solvent may be used as a source of pulp in the manufacture of paper products, but if they contain colored printed matter, they are advantageously subjected to a de-inking step. While any of the available processes of removing ink from paper may be used, it will be found advantageous to use the novel de-inking step herein described, where two oxidation treatments are relied upon to remove the colored ink from the chips.

In this novel de-inking process, the paper chips from which the wax and solvent have been removed and without fibration are first treated with an alkaline solution of a peroxide, for example a solution containing caustic soda and sodium peroxide, and are subsequently treated with a solution of a water-soluble hypochlorite, for example sodium hypochlorite.

While the conditions of the two oxidation treatments may vary widely, the following is an illustrative example:

100 grams of dry de-waxed cardboard from milk bottles (cut to strips approximately ½ inch by 2 inches) were placed in 1670 cc. of water (a ratio of approximately 6 to 100) and heated to 82° C. and held there for about fifteen minutes. The mass was then removed from the heat, allowed to cool to 77° C. and then to this mix was added 1.5 g. of caustic soda in 10 cc. of water and 1.5 g. of sodium peroxide (also previously dissolved in 10 cc. of water). The temperature was held at 71° C. for 30 minutes and then raised to 77° C. for 60 minutes. During this 90 minute interval there was occasional mild agitation, sufficient to cause good contact between the paper and the chemicals but not of such a violent nature as to cause the softened and swollen paper strips to shred or to disintegrate. This was followed by two cold rinses to reduce the alkalinity to a pH of about 7.2.

Sufficient sodium hypochlorite (6.67 g. of a solution having 15% available chlorine) was added to supply 1% available chlorine, and the total mass, now about 2000 cc. was held at 49° C. for 2½ hours with occasional stirring. The de-inked and bleached paper was then rinsed once with cold water and dried.

Referring to the flow sheet of the drawing, the waxed paper from the stock pile passes through a suitable cutting and chopping device 1 to provide paper chips of the desired size and then to the paper chip bin 2. From the bin 2, the paper chips are fed to the wax extraction equipment which in general comprises a series of horizontal cylinders 3, 4, and 5 in which the paper chips are subjected to counter-current extraction, the general movement of the paper through the equipment being opposite to the general movement of the solvent through the same equipment. Each of the cylinders 3, 4, and 5 is equipped with a helical screw conveyor driver electrically from an extended shaft at one end, and electrically driven pumps (not shown) carry the paper chips from cylinder 3 to cylinder 4 and from cylinder 4 to cylinder 5. The paper chips enter the right end of cylinder 3, are discharged from the left end of that cylinder into the left end of cylinder 4, are carried through that cylinder and discharged from the right end thereof into the right end of cylinder 5 and are then carried through and are discharged from the left end of cylinder 5. The solvent storage is indicated at 6 and the solvent flows from this tank to a solvent feed tank 7 from which it is delivered to the left end of cylinder 5 by a pump (not shown). The solvent, as illustrated in the flow sheet, flows counter-current to the paper chips through cylinders 5, 4, and 3 in turn. It will be seen that the paper chips from which most of the wax has been removed come into contact with fresh solvent in cylinder 5, for removal of the final traces of wax.

The horizontal cylinders 3, 4, and 5 preferably provide a closed system and are supplied with heating means so that the desired temperature may be supplied to the solvent, for example, the cylinders may be steam jacketed or they may be heated by electric coils or the like. Each cylinder, if desired, may be equipped with a clutch, which, when thrown, changes the progressive movement of the screw conveyor into an oscillating movement (partial or full turn and reverse). The clutch may be thrown during the extraction treatment to provide thorough penetration of the solvent into each paper chip and the agitation by the oscillating movement can be carried on for as much time as may be required for each extraction step within the cylinders, or if desired, the oscillating movement may be interspersed with the progressive movement of the screw conveyors. At the end of the desired time, the clutch is thrown and the progressive movement of the screw conveyor is resumed.

Referring again to the flow sheet, the paper chips, thoroughly soaked with solvent, are passed to a drier 8 or other means to supply heat to vaporize the solvent, the solvent being condensed in condenser 19 and returned to solvent feed tank 7, preferably, however, by adding it to the solvent separated from the wax, for example to the solvent reclaiming tank 18. The paper chips are then ready for re-use in the manufacture of paper or for storage and sale for that purpose unless de-inking is required, in which case the paper chips are treated by a de-inking process and subsequently dried. In the preferred embodiment when de-inking is required, the paper chips from the solvent drier 8 are passed to the first oxidizing bath (an alkaline solution of a peroxide) shown as tank 9; then to the second oxidizing bath (a solution of a water-soluble hypochlorite) shown as tank 10, and thence to drier 11.

The solvent heavily laden with wax removed from cylinder 3 is passed through strainer 12 to remove any solid material and then through decolorizing filtration equipment 13 containing bone char, fuller's earth, or the like to remove any coloring materials. As stated above, the filtration equipment is heated by suitable means to maintain the solution of wax in the solvent at the desired temperature. The clarified solution is then cooled or chilled in a tank or in coils 14, to which is connected a refrigeration unit 15, the temperature of the solution being lowered to the point where the solvent will have very little or no solvent power for the wax. As a result of this cooling, the wax will separate from the solution as a sludge and the resulting slurry is passed to the separation equipment 16 which may be a filter press, but is preferably a centrifuge including a scraping unit for the removal of the separated wax. The wax is discharged into the wax drier 17 to remove the residual solvent which is passed through a condenser (not shown) and is added to the main solvent separated from the wax which is flowed from the separating equipment 16 to reclaiming tank 18. The wax, after removal of the residual solvent by drier 17 may be compressed or melted into blocks or cakes ready for re-use in the treatment of paper or for packing or sale for that or other purposes. The solvent recovered is returned from reclaiming tank 18 to solvent feed tank 7 by means of a pump (not shown).

From the foregoing description, it will be seen that the process of the invention provides a simple and economical method for the treatment of waxed paper by which both the wax and the paper are recovered in a commercially available and valuable form. Considerable modification is possible in the steps of the process of the invention without departing from the scope thereof.

I claim:
1. The process of treating waxed paper to separate the wax from the paper which comprises immersing the waxed paper in the form of paper chips in a chlorinated aliphatic hydrocarbon which is liquid at ordinary temperature and which has a vapor pressure less than about 200 mm. of mercury at 40° C., at an elevated temperature below about 121° C. to dissolve the wax; separating the resulting solution of wax from the paper chips; cooling said solution to precipitate at least a preponderant proportion of the wax therefrom, and removing the chlorinated hydrocarbon solvent from the wax which separates from the solution.

2. The process of claim 1 wherein the chlorinated hydrocarbon solvent is passed counter-currently to the paper chips.

3. The process of treating waxed paper to separate the wax from the paper which comprises immersing the waxed paper in the form of paper chips in a liquid chlorinated aliphatic hydrocarbon selected from the group consisting of carbon tetrachloride, ethylene dichloride, trichlorethylene, perchlorethylene, tetrachlorethane and pentachlorethane at an elevated temperature below about 121° C. to dissolve the wax; separating the resulting solution of wax from the paper chips; cooling said solution to precipitate at least a preponderant proportion of the wax therefrom, and removing the chlorinated hydrocarbon solvent from the wax which separates from the solution.

4. The process of treating waxed paper to separate the wax from the paper which comprises immersing the waxed paper in the form of paper chips in a chlorinated aliphatic hydrocarbon which is liquid at ordinary temperature and which has a vapor pressure less than about 200 mm. of mercury at 40° C., at an elevated temperature below about 121° C. to dissolve the wax; separating the resulting solution of wax from the paper chips; passing said solution while still at an elevated temperature through an adsorption medium to remove coloring matter therefrom; cooling said solution to precipitate at least a preponderant proportion of the wax therefrom, and removing the chlorinated hydrocarbon solvent from the wax which separates from the solution.

References Cited in the file of this patent

UNITED STATES PATENTS

| Number | Name | Date |
|---|---|---|
| 38,540 | Van Wyck | May 12, 1863 |
| 1,072,035 | Richter | Sept. 2, 1913 |
| 1,284,647 | Gaynor | Nov. 12, 1918 |
| 1,933,609 | Wagner | Nov. 7, 1933 |
| 2,078,186 | Wiles | Apr. 20, 1937 |
| 2,200,622 | Hines | May 14, 1940 |
| 2,298,943 | Howard | Oct. 13, 1942 |
| 2,341,045 | Kiersted | Feb. 8, 1944 |
| 2,441,202 | Maier et al. | May 11, 1948 |
| 2,491,115 | Kincaide | Dec. 13, 1949 |
| 2,501,880 | Sweeney et al. | Mar. 28, 1950 |

OTHER REFERENCES

Lee: Chemical Engineering, January 1948, pp. 106–108.
Printing Inks, by Ellis, published by Reinhold Publishing Corp., New York (1940), pp. 480–482.
Commercial Waxes, by Bennett, published by Chemical Publishing Co., Inc., Brooklyn, New York (1944), pp. 31, 32, 34, 39, 382 and 383.